US008925597B1

(12) United States Patent
Beringer

(10) Patent No.: US 8,925,597 B1
(45) Date of Patent: Jan. 6, 2015

(54) BOTTLE FILL VALVE ACTUATOR

(71) Applicant: Bernie Beringer, Jonesborough, TN (US)

(72) Inventor: Bernie Beringer, Jonesborough, TN (US)

(*) Notice: Subject to any disclaimer, the term of this patent is extended or adjusted under 35 U.S.C. 154(b) by 0 days.

(21) Appl. No.: 13/987,541

(22) Filed: Aug. 5, 2013

Related U.S. Application Data

(63) Continuation of application No. 12/002,026, filed on Dec. 15, 2007, now abandoned.

(51) Int. Cl.
| B65B 3/04 | (2006.01) |
| B67C 3/22 | (2006.01) |
| F16K 31/52 | (2006.01) |

(52) U.S. Cl.
CPC .. B67C 3/22 (2013.01); F16K 31/52 (2013.01)
USPC ............ 141/147; 141/144; 141/145; 141/146

(58) Field of Classification Search
CPC ........................................................ B67C 3/22
USPC ................... 141/21, 144–147, 192, 392, 39; 251/251, 257, 258; 384/244, 425, 439, 384/438; 74/567, 569
See application file for complete search history.

(56) References Cited

U.S. PATENT DOCUMENTS

| 1,647,334 | A | * | 11/1927 | Bart .......................... 137/625.26 |
| 3,463,203 | A | * | 8/1969 | Wolf ................................ 141/39 |
| 4,053,003 | A | * | 10/1977 | Ferrero et al. ................. 141/144 |
| 4,086,943 | A | * | 5/1978 | Fernandez ........................ 141/39 |
| 5,119,853 | A | * | 6/1992 | Petri et al. ........................ 141/39 |
| 5,586,379 | A | * | 12/1996 | Nish ............................. 29/401.1 |
| 5,642,764 | A | * | 7/1997 | Nish .............................. 141/392 |
| 5,924,462 | A | * | 7/1999 | McKaughan ................. 141/145 |
| 6,038,833 | A | * | 3/2000 | Beringer ......................... 53/253 |
| 8,695,647 | B2 | * | 4/2014 | Ruble ............................ 141/147 |

* cited by examiner

Primary Examiner — Timothy L Maust
Assistant Examiner — Timothy P Kelly

(57) ABSTRACT

A beverage fill valve actuator adapted for being sealing mounted thru the wall of a beverage fill tank, the actuator having an elongated housing formed with an axial bore extending completely therethrough and providing a tubulate bearing structure at its inner end, a camshaft rotatably mounted in the bore and having its distal end rotatably mounted within the bearing structure with a predesigned selected clearance therebetween, and wherein the camshaft, bearing and barrel structures allow axial motion of the camshaft within the bore of from about 0.002 in. to about 0.020 in. while maintaining the selected clearance.

20 Claims, 5 Drawing Sheets

BOTTLE FILL VALVE ACTUATOR

This application claims priority under 35 U.S.C. 119(e)(1) based on Applicants Provisional U.S. Patent Application Ser. No. 60/875,709 filed 12-19-16 of the same title and of U.S. patent application Ser. No. 12/002,026, filed Dec. 15, 2007 of same title.

BACKGROUND OF THE INVENTION

1. Field

This invention relates to necked container filling machines principally those of the carousel type, and particularly concerns unique cam operated actuators for use with fill valves for beverage bottles, cans or the like wherein each actuator employs a camshaft provided with O-ring seals which slidably rotatably mount the camshaft in the bore of an actuator barrel (shaft housing) for rotative motion therein whereby each cam which is inside the fill tank can contact a cam follower on a fill valve and progressively urge the valve between an open filling position and a closed position.

2. Prior Art

Conventional fluid filling machines such as are used for filling beer or soft drink bottles typically are constructed to provide multiple filling stations which move along in a continuous conveyor-like manner, e.g., in a circle, and while so moving, progressively perform various operations leading to filling of the bottles. With such machines, conveyor systems are provided for bringing empty bottles to the machines and for removing filled bottles therefrom.

Typical of such filling machines is the carousel type shown and described in detail in the service manual entitled EUROSTAR BOTTLE FILLER, SERVICE MANUAL. Copyright 1980 TECHNAPAC, Inc. The Barry-Wehmiller Company, 318 pages, and particularly on pages 1-1, 1-2, and 2-1 thru 2-14 thereof, the disclosure of which manual is hereby incorporated herein in its entirety. In these machines, particularly the ones relevant here, a large circular fill tank rotates on a horizontal base and carries a large number of fill valves and cam type actuators therefor, which actuators are mounted on and extend thru a peripheral wall of the fill tank. The outer end of each actuator is provided with a lever (46 in the present drawings) which when struck by a shoulder means affixed to said base will rotate the actuator to open or close the fill valve in a predetermined sequence as the fill tank and its accouterments rotate.

For further background information the progressive operations of such machines as described above are shown in schematic form in FIGS. 8 and 9 herein marked Prior Art, and with the operations approximately delineated by position and numbered progressively Op. #1 thru Op. #5. In FIG. 9 the circular or rotational actions of the machine of FIG. 8 are depicted in linear form for clarification.

In these figures Op. #1 brings the bottles 11 to Op. #2 in feed star wheel A which moves the bottles in a circle toward the tangential junction area B of star wheel A and in registry with the moving bottle supports or pads C (only one shown in dotted line) of the rotating carousel. After each bottle is positioned by star wheel A on a support C, the bottle is lifted vertically in Op. #3 by a support cylinder (e.g., air) and the bottle neck top D is engaged, captured and sealed at J by a centering cup E shown in simplistic form. Referring to FIG. 8 elevation of support C in Op. #4A, moves the bottle 11 and cap E upwardly to a point where a seal unit F in the centering cup is pressed against neck top D and a sealing surface G surrounding a fill port H on a filler bowl or tank 13 on the machine. Typically at this stage (#4B) the air in the bottle is evacuated and then pressure equalization in the bottle and fill bowl is performed at Op. #4C, and filling of the bottle takes place at Op. #4D. When the filling is completed, the support C is moved downwardly in Op. #5, typically by a cam ramp provided on a non-rotating structure of the machine and engageable with a cam follower on support C. With the bottle now in its retracted position, it is captured in another star wheel J tangentially of the carousel and moved onto further processing operations such as bottle sniffing and capping.

It is particularly noted that depending on the type and make of filling machine, the location of the various operations described above may be different, however, the present invention is applicable to any such machine.

One type of cam assembly presently also termed "actuator", has a camshaft typically substantially free floating at its cam end and is engineered in a way that one actuator is placed above each fill valve in existing beverage filler machines with its cam aligned with a cam follower on the fill valve. The cam of the actuator is intended to open the particular fill valve it is associated with when the camshaft is rotated in one direction to allow the proper amount of liquid to enter the can or bottle and then to close the fill valve when the camshaft is rotated in the opposite direction.

This assembly, heretofore, would need continual greasing of the O-ring seals and wall portions of the barrel bore against which the seals rub during camshaft rotation with a food grade lubricant but would still wear the seals and wall portions because of the overhung (free floating) load on the cam end of the camshaft which results in wobbling of the camshaft and causes the net contents to vary in the bottle or can.

The resolution of this problem has been to periodically replace the cam assembly (actuator), an expensive and time consuming measure, however, even then the grease situation ruins the integrity of the beverage. This process of lubrication is time consuming and most of all has been quite essential to maintaining desired net contents of the can or bottle.

Another type of actuator is disclosed in U.S. Pat. Nos. 5,642,764 and 5,586,379 wherein the distal (cam lobe end) end of the camshaft is supported by a cone-shaped bearing structure. This type of bearing can prevent wobbling of the camshaft only for a very limited period of use before any wear of the moving parts of the actuator allows even the slightest axial movement of the camshaft end away from the end plate. It is particularly noted that such a bearing structure requires extremely precise control over preventing axial dislocation of the camshaft end from the end plate during installation since any such dislocation would immediately result in wobbling of the camshaft as the resilient O-ring seals would deform—however slightly.

A typical bottle filling machine and its fill valve structure and operation are shown, in general, in U.S. Pat. Nos. 5,642,764; 6,038,833; 4,086,943; and 5,586,379, the disclosures of which are hereby incorporated herein by reference in their entireties.

The present invention has as its objects and resides in a unique mounting and O-ring seal arrangement for the actuator camshaft which provides for:

improved shaft seal and barrel bore wall wear longevity in particular;

elimination of need for shaft lubrication oils or greases such that product integrity is not compromised;

greater concentricity stabilization of the camshaft under extended periods of operation and thusly markedly improved filling integrity;

more positive camshaft support, i.e., larger journal-bearing area for the inner (beverage tank) end of the camshaft which can accommodate, with ease, any axial motion between the barrel and the camshaft;

large cost reduction for actuator parts replacement;

reduction in number of parts and cost of manufacture for the actuator such as by elimination of sleeves, bushings and the like;

improved O-ring structure, in particular extra O-ring grooves in the camshaft such that new O-rings can be added to rub against new land areas of the barrel bore wall which greatly increases barrel life; and overall simplification of structural design of the actuator.

SUMMARY OF THE INVENTION

A unique and improved beverage fill valve actuator in a preferred embodiment employs a camshaft mounted for rotation in the bore of a camshaft housing and wherein a fill valve contact cam lobe 44 is provided on a distal portion of the camshaft, wherein distal portions of the camshaft and housing are adapted to reside within a beverage fill tank, wherein the bore extends completely axially thru the housing, wherein axial bearing means is provided on a distal portion of the housing and rotatably supports a stub shaft on a distal portion of said camshaft, and wherein said stub shaft is sufficiently long to allow relative axial movement between said stub shaft and said bearing means without diminishing predesigned clearance therebetween and without diminishing a desired area of sliding contact of the stub shaft with the bearing means.

BRIEF DESCRIPTION OF THE DRAWINGS

The invention will be understood further from the following description and drawings wherein.

DETAILED DESCRIPTION

Figure 1:
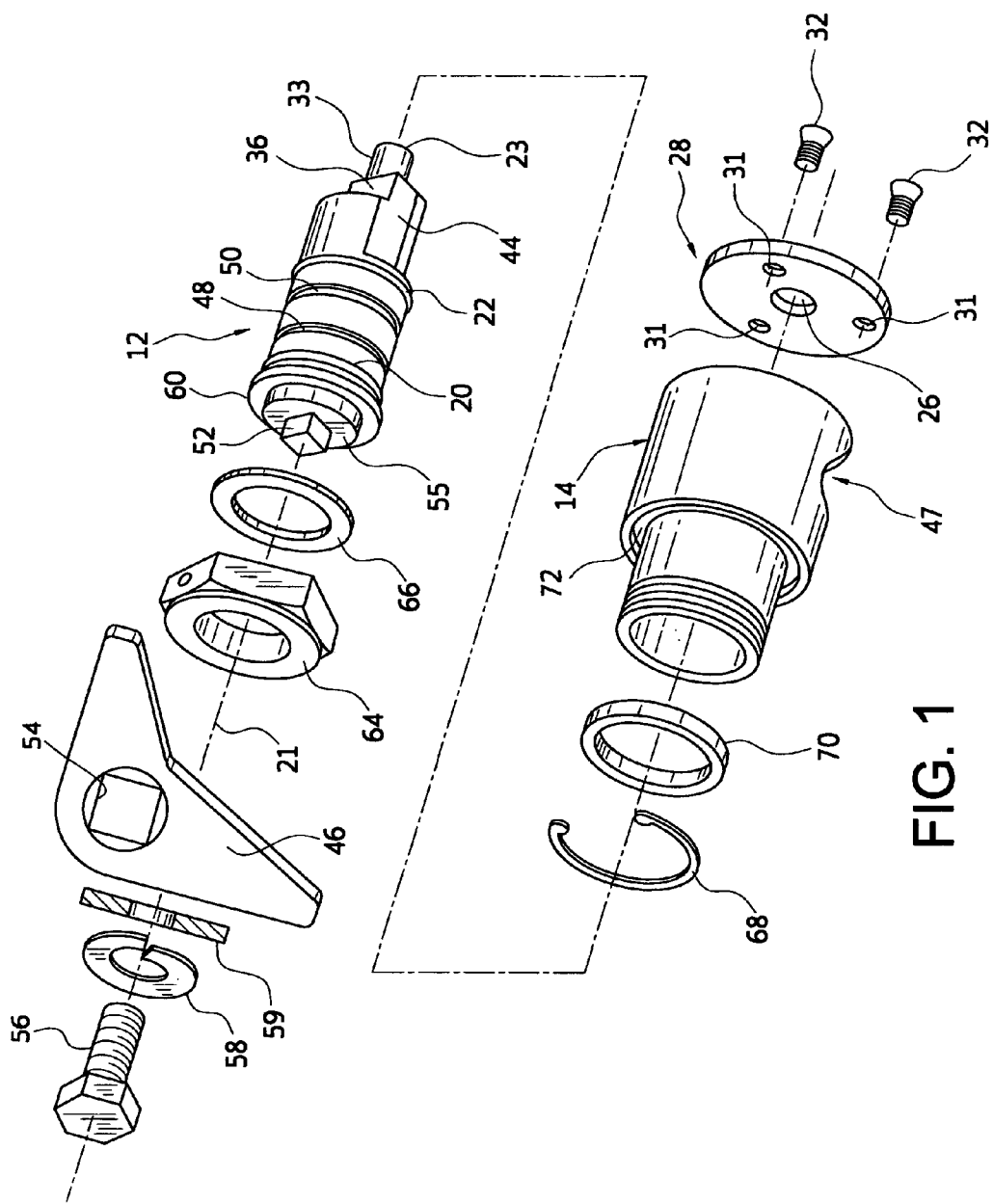
FIG. 1 is an exploded view of the present fill valve actuator.

Referring to the drawings the present fill valve actuator generally designated 10 comprises a camshaft 12 for rotatable mounting in the bore 18 of a barrel 14. This camshaft preferably is comprised of ERTALYTE® polyester, the specifications for which are given in the attached spec. sheet titled "ERTALYTE® PET-P". Other plastics and metals may, of course, be used for the camshaft. The barrel 14 preferably is stainless steel but again, is not limited thereto.

The outer end (approximately designated 16) of the camshaft is concentrically supported in the barrel bore 18 by O-ring seals 20 and 22, preferably of Teflon® impregnated VITON® elastomeric material or the like.

Figure 11:
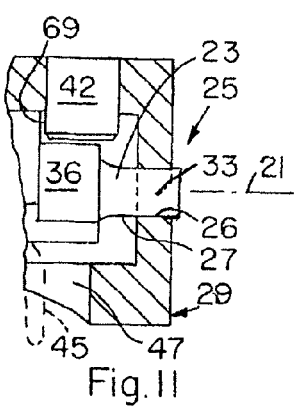
FIG. 11 is a partial view of a variation of the distal end portion of the present actuator wherein bearing means 26 is formed in an integral segment of the housing without a separate end cap such as 28.
Figure 8:
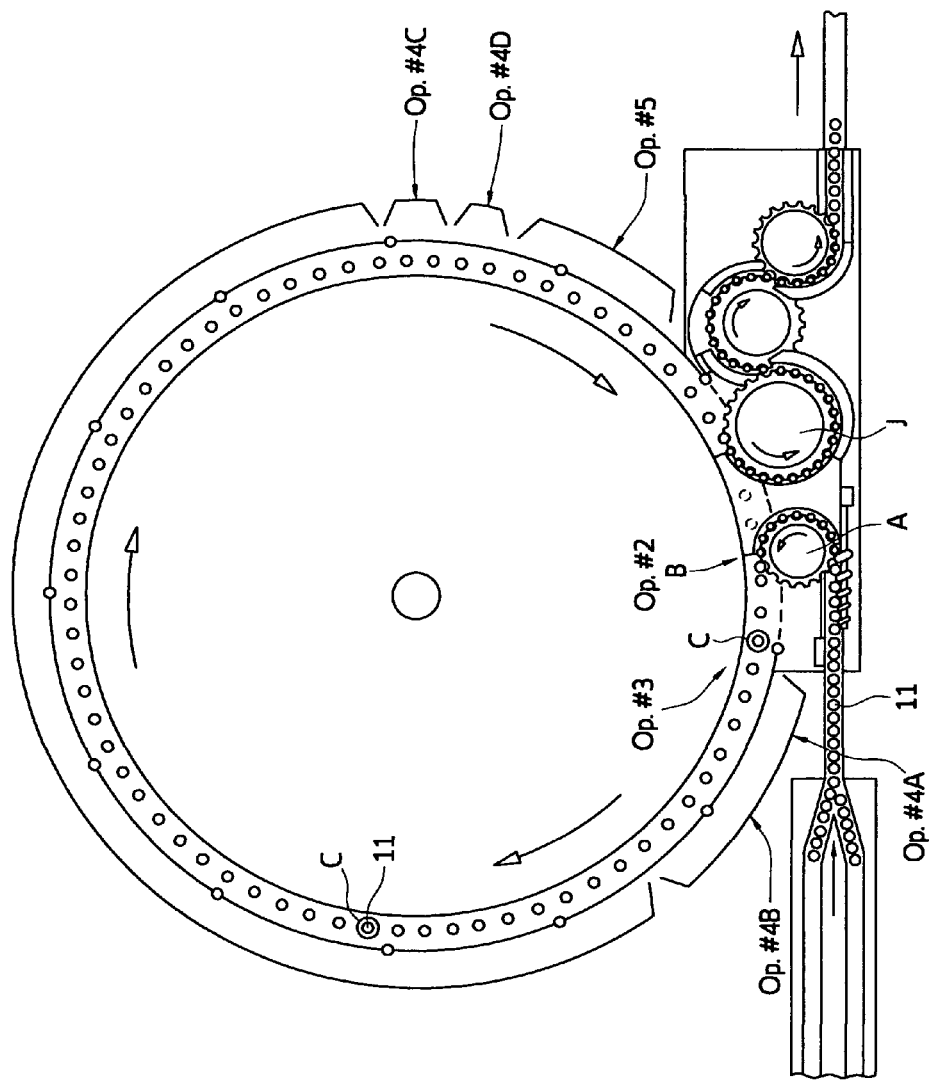
FIG. 8 is a schematic of a typical bottle filling machine as viewed from above.
Figure 9:
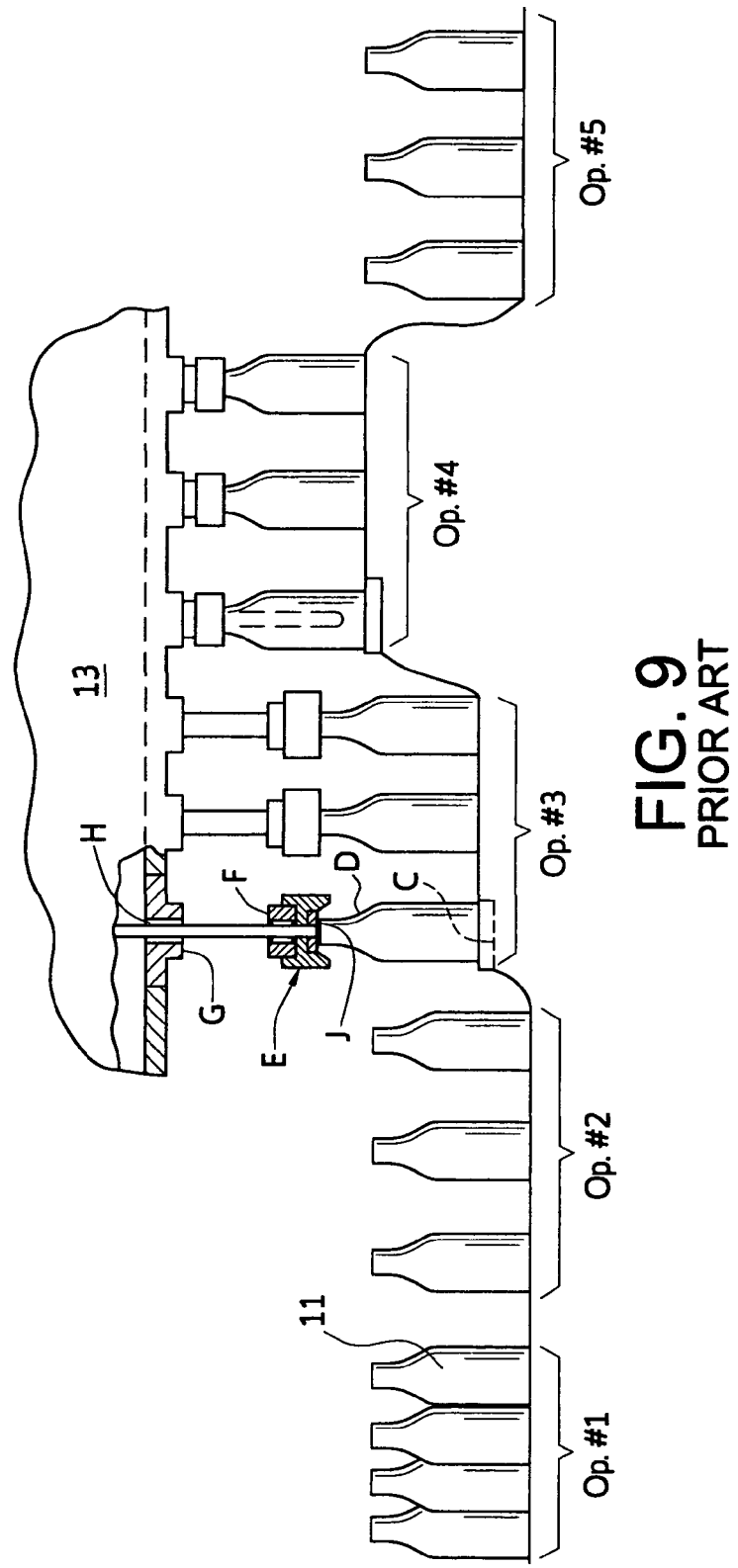
FIG. 9 is a side view of FIG. 8.
Figure 10:
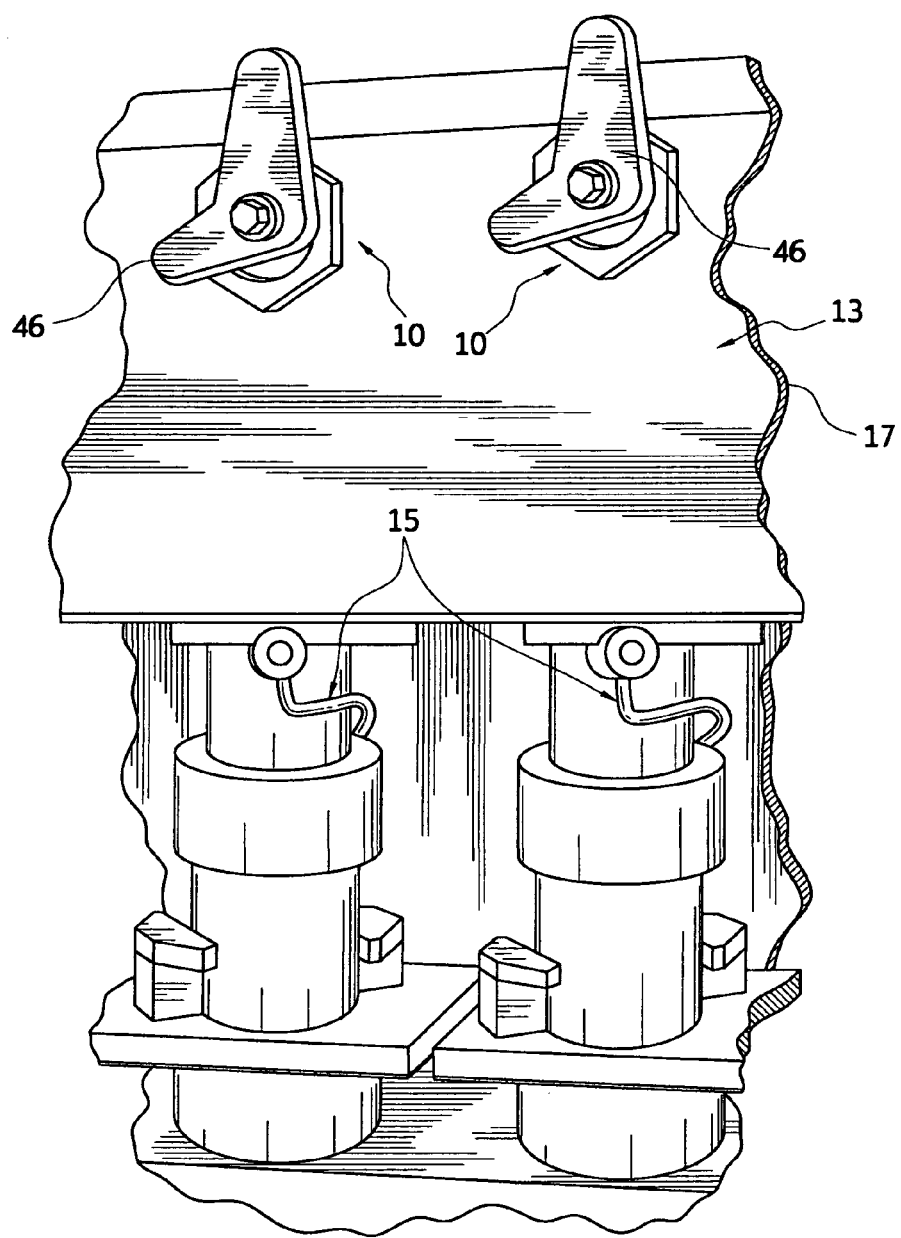
FIG. 10 is a side view of portions of a fill tank 13 and fill valves 15 and showing fill valve actuators such as 10 mounted thru the tank wall 17 and having levers 46.

A stub shaft 23 on the inner (beverage tank) end (approximately designated 19) of the camshaft is rotatably supported in a bearing means generally designated 25 and comprising stub shaft 23 rotatably mounted in a bearing bore 26 formed thru an end cap 28 which is affixed on the innermost end 30 of barrel 14 by screws 32 passing thru holes 31 in the cap and threaded into screw bores 34 in 30. Cap 28 or integral segment 29 (FIG. 11) is made sufficiently thick, e.g., 5/16 in. with the bearing bore 26 of 3/8 in. diameter which gives a shaft journal 33 tubular contact surface 35 of approximately 0.36 in$^2$. It is preferred that this journal area be between about 0.2 in.$^2$ and about 0.6 in.$^2$ to give the markedly improved concentric support and longevity to the camshaft and bore wall 18.

As an alternative structure to cap 28, barrel bore 18 and bearing bore 26 can be machined (e.g., drilled) simultaneously axially thru a barrel blank which can be of solid material or, e.g., a cast metal blank having a machinable cast barrel bore and a machinable cast bearing bore, thus eliminating the need for the cap 28 and for its mounting screws construction and installation operations, which construction does not lend itself to the accuracy of line boring.

It is also highly preferred that the uniform diameter portion "L" of the stub shaft be at least from about 0.005 in. to about 0.020 in. longer than the axial length of bore 26 such that relative axial motion between the two will not significantly diminish the contact surface of the stub shaft and bore. In this regard, shaft 33 in the initial installation, may extend outwardly beyond cap 28 a desired distance, e.g., 0.010 in.-0.020 in. Cap 28 preferably is also of ERTALYTE material.

Figure 2:
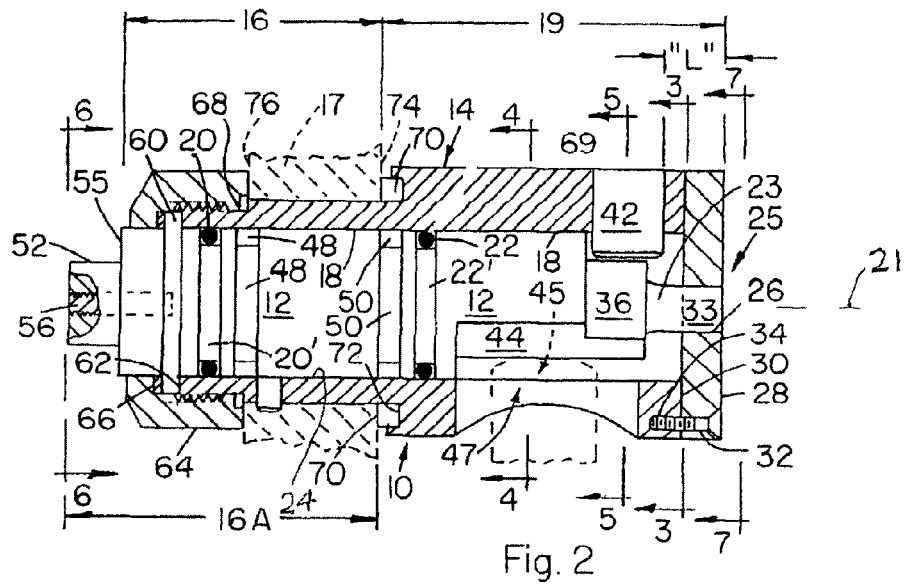
FIG. 2 is a longitudinal cross-sectional view of the assembled valve barrel and camshaft (with the camshaft shown in relief) of FIG. 1.
Figure 3:
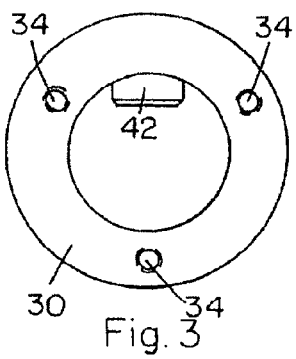
FIG. 3 is a view taken along line 3-3 in FIG. 2 with the camshaft and inner (beverage tank) end cap removed.

It is particularly noted that the length "L" of the uniform diameter portion of the stub shaft 23 is sufficient to provide good lateral stability to the camshaft end even though wear of portions of the actuator such as the camshaft, Teflon washers 66 or barrel can allow axial motion of 23 within bearing bore 26. For example, as shown in FIG. 2, the gap 69 can be sufficiently wide, e.g., 0.010 in.-0.020 in. to allow significant axial motion between the shaft and the barrel without diminishing the effectiveness of the bearing means 25 which remains within close tolerance between the journal 33 and bore 26, of for example, 0.002 in.-0.005 in. It is noted that by employing a completely thru barrel bore the bearing means 25 is always exposed at each end either to the fill liquid itself or its vapors or bubbles which aide in continuous lubrication of 25 without the need for greases or the like. This structural aspect of the present invention is very important to achieving the objects of improved actuator longevity.

It is noted that an aspect of the present invention has been the discovery that the ERTALYTE material can be used for the camshaft as well as for the end cap 28 without experiencing the expected increased wear of these components due to their identical compositions. In this regard, while it is not preferred, various types of bearings such as bushings or roller bearings can be employed for the stub shaft mounting.

Integral with the inner end 19 of the camshaft is a stop segment 36 which has a first stop shoulder 38 and a second stop shoulder 40, one each of which is configured to engage pin 42 when the camshaft is rotated to its fill valve opening position or its fill valve closing position to thereby prevent over-travel of the cam surface 44 of the camshaft in either direction. Surface 44 engages, in one embodiment of a typical fill valve, an upper cam follower 45 of the valve which extends up thru port 47 in the barrel 14 and engages cam surface 44, whereby upon rotation of the camshaft will to either open or close the fill valve by the operation in conventional manner of a lever 46 affixed to the camshaft 12.

An aspect of the present invention is the provision of, for example 2-4 spare O-ring grooves such as 48 and 50 in the camshaft such that if wear of O-rings 20 and 22 and the adjacent wall surfaces 20' and 22' of bore 18 becomes troublesome over long periods of time, it will be necessary only to replace 20 and 22 with new O-rings in grooves 48 and 50 rather than to replace the whole actuator. In this way new bore wall surfaces are exposed to the new O-rings.

Referring to FIGS. 1 and 2, in particular, the camshaft is formed, from left to right, with a keying segment 52 over which the mating aperture 54 in lever 46 is mounted and the lever then secured to outermost end 55 of the camshaft by bolt 56, lock washer 58 and flat washer 59. A shoulder 60 on the camshaft is slidably, rotatably clamped between the outer end 62 of barrel 14 and nut 64 (and Teflon washer 66) whereby substantial axial motion, e.g., over about 0.003 in. in the initial installation, between the camshaft and the barrel is prevented. A crescent ring 68 engages nut 64 and limits its compression against shoulder 68 in order to allow 68 to rotatably slide (with close tolerance) against end 62 of the barrel.

A rubber or other elastomeric gasket ring 70 is fixed in a groove 72 in the barrel and is sealingly compressed against the inner wall surface 74 of the beverage tank by the compressive force of nut 64 (and ring 68) bearing against the outer wall surface 76 of the tank. It is noted that dimensions of these components are carefully controlled in order to provide good hermetic sealing of the actuator to the beverage tank wall 17.

Figure 4:
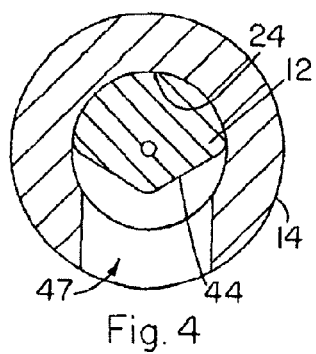
FIG. 4 is a cross-sectional view taken along line 4-4 in FIG. 2.
Figure 5:
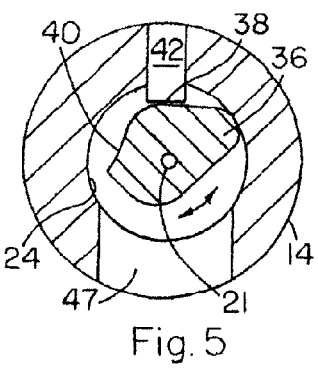
FIG. 5 is a cross-sectional view taken along line 5-5 in FIG. 2.
Figure 6:
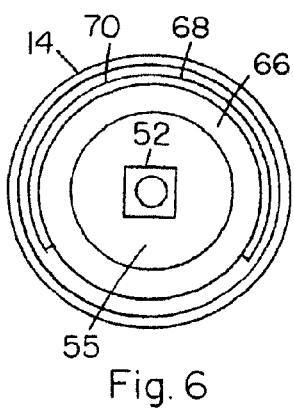
FIG. 6 is an end view taken along line 6-6 in FIG. 2.
Figure 7:
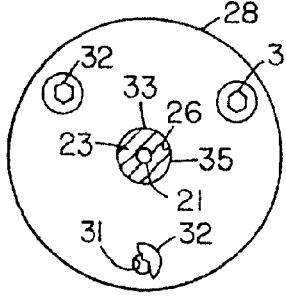
FIG. 7 is an end view taken along line 7-7 in FIG. 2.

A preferred embodiment of the invention, with particular reference to the claims herein, is expressed as a bearing fill valve actuator 10 comprising an elongated housing 14 having a camshaft bore 18 extending axially 21 completely therethrough, said housing having a proximal portion 16 adapted for sealing attachment thru a wall 17 of a fill tank 13 and having a distal portion 19 adapted to extend into said tank in proximity to a fill valve such as shown and described in the aforesaid U.S. Pat. No. 4,086,943 (FIGS. 1 and 4), a fill valve access port 47 formed thru said housing at said distal portion thereof, tubulate bearing means 26 axially formed in an inner (distal) end 28 of said housing distally of said access port 47, a camshaft 12 rotatably mounted in said bore 18 and having a stub shaft 23 formed axially on the distal end 27 of said camshaft and mounted thru said being means 26, a proximal portion 16A of said camshaft extending outwardly of said proximal portion 16 of said housing and carrying a camshaft rotator means 46, a cam lobe 44 formed on said camshaft and positioned adjacent to and exposed to said access port 47 for being brought into contact with an activating structure 45 (such as elements 4, 49, 5, 6, 8, 9, 10, 11, 13 and 14 of said U.S. Pat. No. 4,086,943) of a fill valve, and resilient deformable seal means 20 on said camshaft slidably engaging the wall 24 of said bore for preventing leakage of beverage out of said fill tank.

The invention has been described in detail with particular reference to preferred embodiments thereof, but it will be understood that variations and modifications will be effected with the spirit and scope of the invention.

I claim:

1. A beverage fill valve actuator comprising an elongated housing having a camshaft bore extending axially completely therethrough, said housing having a proximal portion adapted for sealing attachment thru a wall of a fill tank and having a distal portion adapted to extend into said tank in proximity to a fill valve, a fill valve access port formed thru said housing at said distal portion thereof, tubular bearing means axially formed in an inner end of said housing distally of said access port, a camshaft rotatably mounted in said bore and having a stub shaft formed axially on a distal end of said camshaft and rotatably mounted thru said tubular bearing means at a selected clearance therebetween, a proximal portion of said camshaft extending outwardly of said proximal portion of said housing, a camshaft rotation lever on said proximal portion of said camshaft, a cam lobe formed on said camshaft and positioned adjacent to and exposed to said access port for being brought into contact with an activating structure of a fill valve, and elastomeric resilient deformable seal means on said camshaft slidably engaging the wall of said bore for aiding in maintaining axial alignment of said camshaft and preventing leakage of beverage out of said fill tank.

2. The fill valve actuator of claim 1 wherein said selected clearance is from about 0.001 in. to about 0.005 in.

3. The fill valve actuator of claim 1 wherein said stub shaft is of uniform diameter and from about 0.002 in. to about 0.040 in. axially longer than the axial length of said tubular bearing means, and wherein the structure of said housing and camshaft are dimensioned to allow axial movement therebetween of from about 0.002 in to about 0.020 in. in order to provide good stub shaft support even though wear of various portions of said housing and camshaft allow significant axial movement therebetween.

4. The fill valve actuator of claim 1 wherein said elastomeric resilient deformable seal means comprises at least one elastomeric O-ring mounted in a peripheral groove in the proximal portion (16A) of said camshaft wherein, at least one elastomeric O-ring is mounted in a peripheral groove in the distal portion (19) of said camshaft, and wherein at least one spare peripheral O-ring groove is formed in said camshaft, whereby if troublesome wear occurs, particularly of the adjacent wall portions of the barrel bore, new O-rings can be readily placed in the spare grooves and a new barrel or entire fill valve actuator replacement would not be required.

5. The fill valve actuator of claim 4 wherein one of said elastomeric O-rings is positioned in said proximal portion of said camshaft, one of said elastomeric O-rings is positioned in said distal portion of said camshaft, and at least one spare peripheral groove is formed in each of said proximal and distal portions of said camshaft which lie intermediate said at least one O-ring.

6. The fill valve actuator of claim 1 wherein a tubular contact surface (35) of said stub shaft with said tubular bearing means ranges between about 0.2 in$^2$ and 0.6 in$^2$.

7. A beverage fill valve actuator comprising an elongated housing having a camshaft bore extending axially completely therethrough, said housing having a proximal portion adapted for sealing attachment thru a wall of a fill tank and having a distal portion adapted to extend into said tank in proximity to a fill valve, a fill valve access port formed thru said housing at said distal portion thereof, tubular distal bearing structure axially formed in an inner end of said housing distally of said access port, a camshaft rotatably mounted in said bore and having a proximal portion and a distal portion and having a stub shaft formed axially on a distal end of said camshaft and rotatably mounted thru said tubular distal bearing structure at a selected clearance therebetween of from about 0.001 in. to about 0.005 in., wherein said stub shaft is of uniform diameter and from about 0.002 in. to about 0.040 in. axially longer than the axial length of said tubular distal bearing structure, and wherein said housing and camshaft are dimensioned to allow axial movement therebetween of from about 0.002 in to about 0.020 in., a proximal portion of said camshaft extending outwardly of said proximal portion of said housing and carrying a camshaft section lever, a cam lobe formed on said camshaft and positioned adjacent to and exposed to said access port for being brought into contact with an activating structure of a fill valve, and elastomeric resilient deformable seal means on said camshaft slidably engaging the wall of said bore for aiding in maintaining axial alignment of said camshaft and preventing leakage of beverage out of said fill tank.

8. The fill valve actuator of claim 7 wherein said resilient deformable seal means comprises at least one O-ring is positioned in said proximal portion of said camshaft and at least one O-ring positioned in said distal portion of said camshaft, wherein at least one spare O-ring groove is formed in each of said proximal and distal portions of said camshaft which lie intermediate said at least one O-ring.

9. The fill valve actuator of claim 7 wherein a tubular contact surface (35) of said stub shaft with said tubular distal bearing means ranges between about 0.2 in$^2$ and 0.6 in$^2$.

10. A beverage fill valve actuator comprising a camshaft rotatably mounted in a bore in an actuator housing barrel of unitary construction and having a cam adjacent its inner end adapted to engage a cam engaging structure of a fill valve positioned within a fill tank of a container filling machine, whereby rotation of said camshaft thru engagement with timing structure on said machine will cause said cam to bear on said engaging structure and in a predesigned manner to open or close said fill valve, wherein said camshaft is supported by O-ring seals which slidably engage the bore wall of said barrel, and wherein the innermost end of said camshaft is provided with a stub shaft which is rotatably mounted in a reduced diameter bearing portion of said bore in the innermost end of said housing barrel.

11. The fill valve actuator of claim 10 wherein a clearance between said stub shaft and said bearing portion is from about 0.001 in to about 0.005 in.

12. The fill valve actuator of claim 11 wherein said stub shaft is of uniform diameter and from about 0.002 in. to about 0.040 in. axially longer than the axial length of said bearing portion, and wherein the structure of said housing and camshaft are dimensioned to allow axial movement therebetween of from about 0.002 in to about 0.020 in. in order to provide good stub shaft support even though wear of various portions of said housing and camshaft allow significant axial movement therebetween.

13. The fill valve actuator of claim 12 wherein said O-ring seals comprises at least one elastomeric O-ring mounted in a peripheral groove in the proximal portion (16A) of said camshaft, at least one elastomeric O-ring mounted in a peripheral groove in the distal portion (19) of said camshaft, and wherein at least one spare peripheral O-ring groove is formed in said camshaft, whereby if troublesome wear occurs, particularly of the adjacent wall portions of the barrel bore, new O-rings can be readily placed in the spare grooves and a new barrel or entire actuator replacement would not be required.

14. The fill valve actuator of claim 13 wherein one O-ring is positioned in said proximal portion of said camshaft, one O-ring is positioned in said distal portion of said camshaft, and at least one spare O-ring groove is formed in each of said proximal and distal portions of said camshaft which lie intermediate said at least one O-ring.

15. The fill valve actuator of claim 14 wherein a tubular contact surface (35) of said stub shaft with said tubular bearing means ranges between about 0.2 in$^2$ and 0.6 in$^2$.

16. A beverage fill valve actuator mounted through a wall of a fill tank, said fill valve actuator comprising a camshaft rotatably mounted in a bore in a fill valve actuator housing barrel of unitary construction and having a cam adjacent its innermost end adapted to engage a cam engaging structure of a fill valve positioned within a fill tank of a container filling machine, whereby rotation of said camshaft thru engagement with timing structure on said filling machine will cause said cam to bear on said engaging structure and in a predesigned manner open or close said fill valve, wherein said camshaft is supported by seal means which slidably engage the bore wall of said barrel, and wherein said innermost end of said camshaft is provided with a stub shaft which is rotatably mounted in a reduced diameter bearing portion of said bore in the innermost end of said housing barrel.

17. The fill valve actuator of claim 16 wherein said stub shaft is of uniform diameter and from about 0.002 in. to about 0.040 in. axially longer than the axial length of said bearing portion, and wherein the structure of said housing and camshaft are dimensioned to allow axial movement therebetween of from about 0.002 in to about 0.020 in. in order to provide good stub shaft support even though wear of various portions of said housing and camshaft allow significant axial movement therebetween.

18. The fill valve actuator of claim 17 wherein said seal means comprises at least one elastomeric O-ring mounted in a peripheral groove in the proximal portion (16A) of said camshaft, at least one elastomeric O-ring mounted in a peripheral groove in the distal portion (19) of said camshaft, and wherein at least one spare peripheral O-ring groove is formed in said camshaft, whereby if troublesome wear occurs, particularly of the adjacent wall portions of the barrel bore, new O-rings can be readily placed in the spare grooves and a new barrel or entire actuator replacement would not be required.

19. The fill valve actuator of claim 18 wherein one O-ring is positioned in said proximal portion of said camshaft, one O-ring is positioned in said distal portion of said camshaft, and at least one spare O-ring groove is formed in each of said proximal and distal portions of said camshaft which lie intermediate said at least one O-ring.

20. The fill valve actuator of claim 19 wherein a tubular contact surface (35) of said stub shaft with said tubular bearing means ranges between about 0.2 in$^2$ and about 0.6 in$^2$.

* * * * *